April 29, 1952      K. A. FISCHER      2,594,757
MEANS FOR ILLUMINATING A MICROSCOPE DARK
FIELD WITH LIGHT IN CONTRASTING COLORS
Filed May 13, 1948      2 SHEETS—SHEET 1
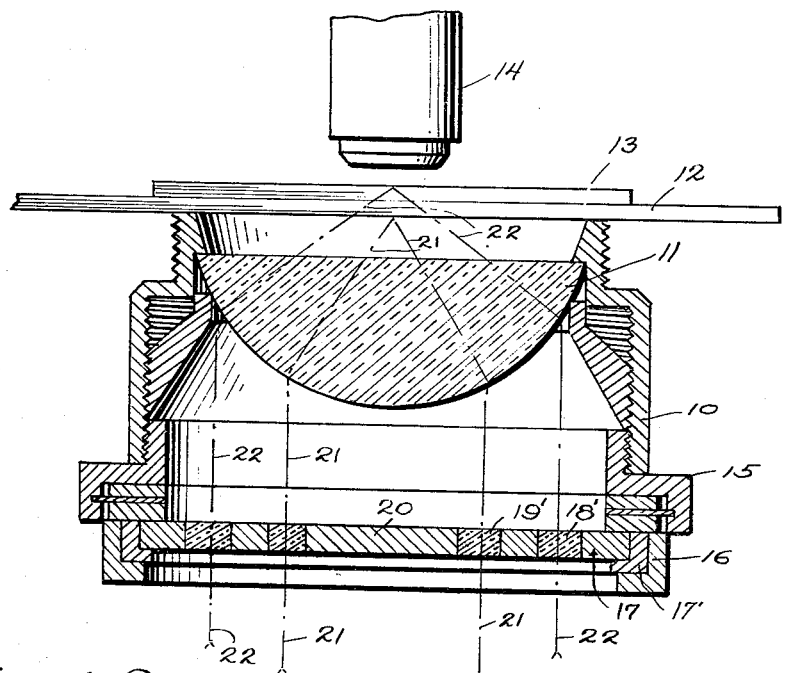
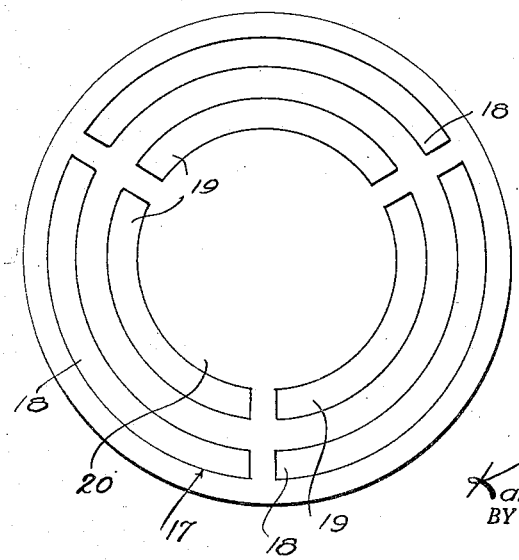
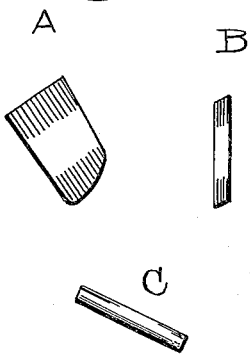
INVENTOR.
Karl A. Fischer
BY W. J. Eccleston
ATTORNEY

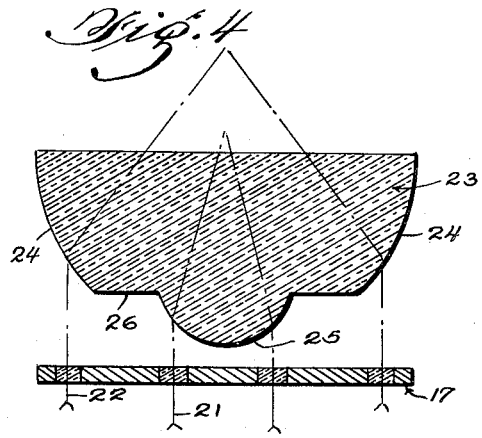
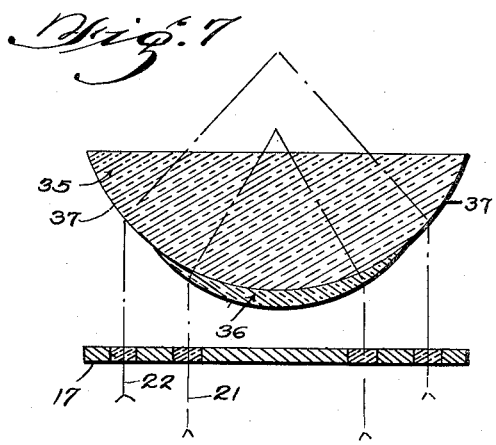
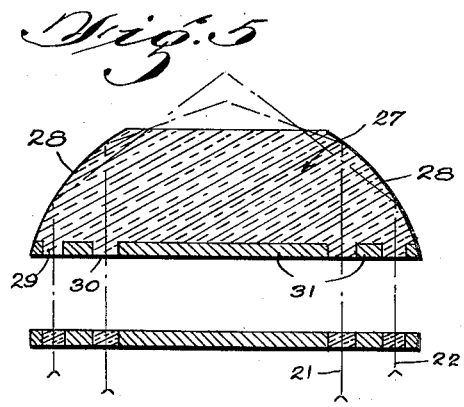
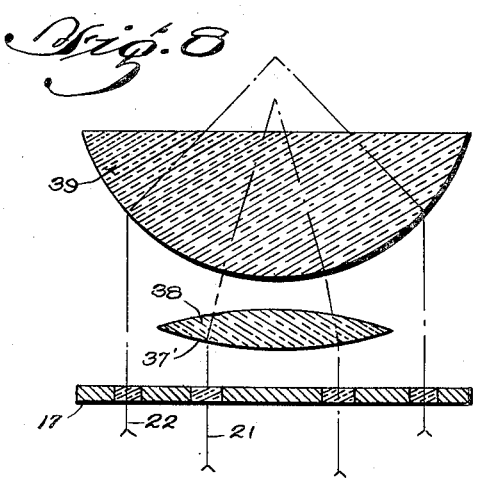
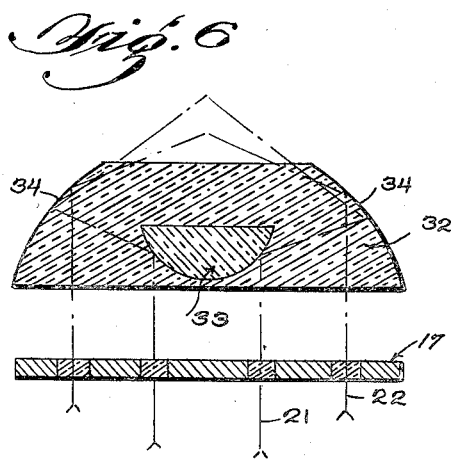
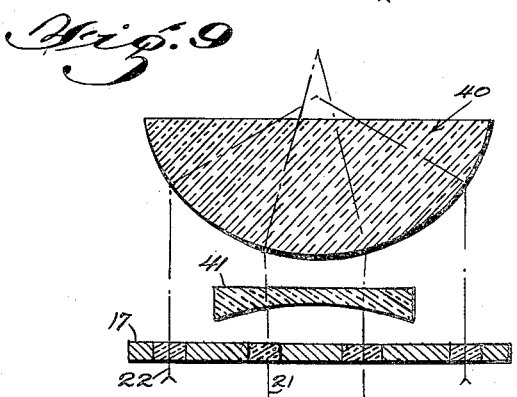

Patented Apr. 29, 1952

2,594,757

UNITED STATES PATENT OFFICE 2,594,757

MEANS FOR ILLUMINATING A MICROSCOPE DARK FIELD WITH LIGHT IN CONTRASTING COLORS

Karl A. Fischer, Washington, D. C.

Application May 13, 1948, Serial No. 26,912

8 Claims. (Cl. 88—40)

(Granted under the act of March 3, 1883, as amended April 30, 1928; 370 O. G. 757)

The invention described herein if patented may be manufactured and used by or for the Government for governmental purposes without the payment to me of any royalty thereon.

This invention relates to a microscope facilitating the observation of crystalline structures with a multiplicity of colored light rays in dark field illumination. More particularly, the invention concerns the utilization of a microscope and improved diaphragm for examination of thin transparent crystalline material in their true three dimensional arrangement in space.

It is an object of this invention to provide an improved diaphragm for use in dark field microscopy.

Another object of this invention is to provide an improved diaphragm and lens arrangement for the examination of thin transparent crystalline material.

An additional object is to provide a diaphragm using a multiplicity of differently colored light transmitting means in combination with a lens arrangement whereby each colored light beam will be focused at a different focal point.

A further object of this invention is to provide a microscope utilizing a multiple color diaphragm in combination with a lens arrangement for transmitting colored light rays and varying the distance at which the focal point of the light rays coincide.

Other objects and advantages will be apparent from the following description of the accompanying drawings, wherein:

Figure 1 is a front plan view showing a microscope condenser lens and diaphragm arrangement partially in cross section;

Figure 2 is a top plan view of a diaphragm;

Figure 3 illustrates the appearance of thin transparent crystals viewed by the microscope shown in Figure 1; and, Figures 4, 5, 6, 7, 8 and 9 illustrate modified lens structures which may be utilized with the filter of Figure 1.

Referring to the drawings, a microscope condenser mounting 10 supports the non-achromatic condenser lens 11 in a conventional manner. Supported above the condenser lens 11 on the condenser mounting 10 are conventional slide 12 and cover plate 13. 14 is an adjustable piece containing the usual conventional microscope lens for viewing an object.

Attached to the base of mounting 10 is a conventional adjustable mount 15 carrying the usual support 16 within which is mounted the modified diaphragm 17 in holding ring 17'.

This modified diaphragm 17 is provided with evenly spaced annularly arranged slots 18 and 19 about its outer periphery, and the center portion is blocked out by a non-transparent center piece 20 to effect dark field illumination.

Figure 1 illustrates, by way of example, the production of complementary, say green and red light beams or rays 21 and 22 in dark field illumination. The path of light for green beam 21, as illustrated by the arrow, is positioned slightly at a lower level than the path of light for red beam 22. As shown in Fig. 1, slot 18 is filled with a transparent material in the nature of a green glass 18' and the inside opening 19 is filled with a ruby glass 19'. If desired, a combination of a blue and yellow coloring may replace the red and green. In any event it is preferred to utilize the color effect in a complementary arrangement. In some cases the filter 17 is provided with an additional slot or slots adjacent to slots 18 and 19 which contain colored filters to supplement and support the color effects produced by the colored glass filters 18' and 19'.

As is indicated in somewhat exaggerated form, the respective focal points of light beams 21 and 22 are projected at separate points on an object, as a wax crystal or the like, due to the non-achromatic characteristics of condenser lens 11 whereby crystalline structures appear as shown in Figure 3. In effect, a plate like needle as illustrated by A, very clearly shows, due to the difference in focal points, the crystal with the top portion of one solid color and the base portion of the complementary color. The same plate or a like plate observed in edgewise position will appear as shown by C with the color effect solid along each side, whereas the inclined needle as shown in B appears with the solid color effect on the top and bottom portions of the crystal.

In the above description of illustrative Fig. 1, the non-achromatic condenser lens 11 is shown in its simplest form with the focal points of the differently colored light beams from filter 17 at a fixed distance from each other. The lenses shown in Figures 4, 5, and 6 are ground to project the individual colors at separate focal points.

Fig. 4 illustrates a condenser lens 23 having its light receiving side divided into an upper convex portion 24 and a lower convex portion 25, with a substantially flattened or non-light transmitting surface 26 between the convex lens portions 24 and 25. In this instance, the colored light beam 21 from filter 19' passes through convex lens portion 25 and colored light beam 22 from filter 18' passes through convex lens 24 to produce focal points in alignment but clearly and distinctly separated by a distance (illustrated in exaggerated relationship) which is dependent upon the grinding of the lens surfaces in a manner well known to the trade.

Fig. 5 illustrates a condenser lens 27 of the parabolic type provided with reflector surfaces 28, of a conventional character and with its base portion provided with light transmitting portions 29 and 30, in alignment with the filter portions 18' and 19' respectively for transmitting light beams 21 and 22 which coincide in alignment with their focal points separated and in reverse position. The darkened portions 31 of lens 27 are in alignment with and correspond to the non-light transmitting portions of filter 17.

Fig. 6 illustrates a condenser lens 32 of the cardioid type with reflector 33 formed therein in a conventional manner and adapted to turn colored light beams 21 against reflector surface 34. This surface 34 also receives differently colored beam 22 directly from filter 18' and thence directs the beams 21 and 22 to separate vertically aligned focal points.

In Fig. 7, the condenser lens 35 may be achromatic or non-achromatic, and is utilized with lens 36. A convex surface 37 is provided to receive the colored light beam 22. The second convex lens 36 is provided as an integral or non-integral portion of the condenser lens 35, and has a somewhat greater convex curvature than surface 37, to receive differently colored light beam 21. As illustrated in exaggerated form, the colored light beams 21 and 22 are projected at separate but aligned focal points which may be adjusted relative to distance of separation when lens 36 is non-integral. In some case, the convex surface 37' may be on a separate adjustable type lens 38, as shown in Fig. 8 for use in conjunction with an achromatic condenser lens 39. Raising or lowering of lens 38, on the optical axis of lens 39, will cause variation in the distance between the focal points of colored beams 21 and 22. The colored light beams 21 and 22 are transmitted through lens 38 and lens 39, respectively, from the color filter 17, and by adjusting the lens 38, in the manner as indicated, the focal point of colored beam 21 can be varied within operable limits of the lenses 38 and 39, as desired. In Fig. 9, a condenser lens 40, which may be achromatic or non-achromatic is illustrated in combination with an adjustable concave type lens 41. The concave lens 41 is adapted to receive and transmit colored light rays 21 to condenser lens 40 from filter 17 and may be moved with respect to lens 40 to vary the focal point of rays 21. The lens 40 receives the colored light rays 22 from filter 17 and brings them to a focal point in alignment with the adjustable focal point of colored light rays 21, for the purposes herein described. The grinding of the various lenses will be in accordance with practice in the trade to accomplish the purpose as described herein in the manner illustrated.

With the arrangement of the microscope lens and color filters in the manner illustrated, and using a non-achromatic condenser lens with the dark field diaphragm and color filters described, or a combination of a dark field diaphragm provided with color filters and an achromatic condenser lens in conjunction with an auxiliary lens for rendering the condenser lens in effect non-achromatic, the focal points for the different colors do not coincide or are separable to effect a showing of the true three dimensional arrangement of difficultly observable objects and this effect is reinforced by elimination of spectral colors of white light through the dark field diaphragm.

The term "non-achromatic," as used in the specification and claims, is intended to encompass non-achromatic lenses as well as achromatic lenses whose effect is rendered non-achromatic by an auxiliary lens.

In accordance with the patent statutes, I have described in detail what I now consider to be the preferred forms of the invention, but it will be obvious that various minor changes may be made in the structural details without departing from the spirit of the invention; and it is intended that all such changes be included within the scope of the appended claims.

I claim:

1. In a dark field microscope: the combination of a circular opaque diaphragm, an annular transparent color filter inset in the outer region of said opaque diaphragm, and a second annular transparent color filter of a different color inset in said opaque diaphragm concentrically with and interiorly spaced from said first annular color filter, said second color filter surrounding the central opaque portion of said diaphragm, and a non-achromatic condenser lens spaced from said diaphragm, the center of said diaphragm being located on the optical axis of said condenser lens whereby an object undergoing microscopic examination in the microscope object plane may be illuminated in more than one color by the differently colored lights transmitted through said color filters, which are projected by said non-achromatic condenser lens onto said microscope object plane at spaced focal points located on the optical axis of said condenser lens.

2. In a dark field microscope: the combination of a circular opaque diaphragm, an annular transparent color filter inset in the outer region of said opaque diaphragm, and a second annular transparent color filter of a complementary color inset in said opaque diaphragm concentrically with and interiorly spaced from said first annular color filter, said second color filter surrounding the central opaque portion of said diaphragm, and a non-achromatic condenser lens spaced from said diaphragm, the center of said diaphragm being located on the optical axis of said condenser lens whereby an object undergoing microscopic examination in the microscope object plane may be illuminated in more than one color by the complementarily colored lights transmitted through said color filters, which are projected by said non-achromatic condenser lens onto said microscope object plane at spaced focal points located on the optical axis of said condenser lens.

3. The embodiment defined in claim 2, wherein one of said annular transparent color filters is red, and the other of said annular transparent color filters is green.

4. The embodiment defined in claim 2, wherein one of said annular transparent color filters is blue, and the other of said annular transparent color filters is yellow.

5. In a dark field microscope: the combination of a circular opaque diaphragm, an annular transparent color filter inset in the outer region of said opaque diaphragm, and a second annular transparent color filter of a different color inset in said opaque diaphragm concentrically with and interiorly spaced from said first annular color filter, said second color filter surrounding the central opaque portion of said diaphragm, and a non-achromatic condenser lens system spaced from said diaphragm, said nonachromatic condenser lens system comprising a condenser lens and an auxiliary lens between said diaphragm and condenser lens in the path of the colored light passing through only one of said color filters, the center of said diaphragm and said auxiliary lens being aligned on the optical axis of said condenser lens whereby an object undergoing microscopic examination in the microscope object plane may be illuminated in more than one color by the differently colored lights which are transmitted through said color filters and projected by said condenser lens system onto said microscope object plane at spaced focal points located on the optical axis of said condenser lens.

6. The embodiment defined in claim 5, wherein said auxiliary lens is integral with said condenser lens.

7. The embodiment defined in claim 5, wherein said auxiliary lens and condenser lens are separate.

8. The embodiment defined in claim 5, wherein said condenser lens and auxiliary lens are separate, and wherein said auxiliary lens is movable on the optical axis of said condenser lens for varying the focal point of the colored light transmitted through one of said transparent color filters.

KARL A. FISCHER.

REFERENCES CITED

The following references are of record in the file of this patent:

UNITED STATES PATENTS

| Number | Name | Date |
| --- | --- | --- |
| 1,887,099 | Kraft | Nov. 8, 1932 |
| 2,083,820 | Bissell | June 15, 1937 |
| 2,105,671 | Roesch | Jan. 18, 1938 |
| 2,182,499 | Ott | Dec. 5, 1939 |
| 2,207,411 | Pierce | July 9, 1940 |
| 2,337,736 | Cawein | Dec. 28, 1943 |
| 2,415,732 | Domingo | Feb. 11, 1947 |
| 2,519,428 | Birch-Field | Aug. 22, 1950 |

FOREIGN PATENTS

| Number | Country | Date |
| --- | --- | --- |
| 100,630 | Switzerland | Aug. 1, 1923 |

OTHER REFERENCES

Powell, "Practical Photomicrography," article in Phono-Technique, published by McGraw-Hill Publishing Co., New York, New York, December 1939, pages 9 and 13.